Figure 1:
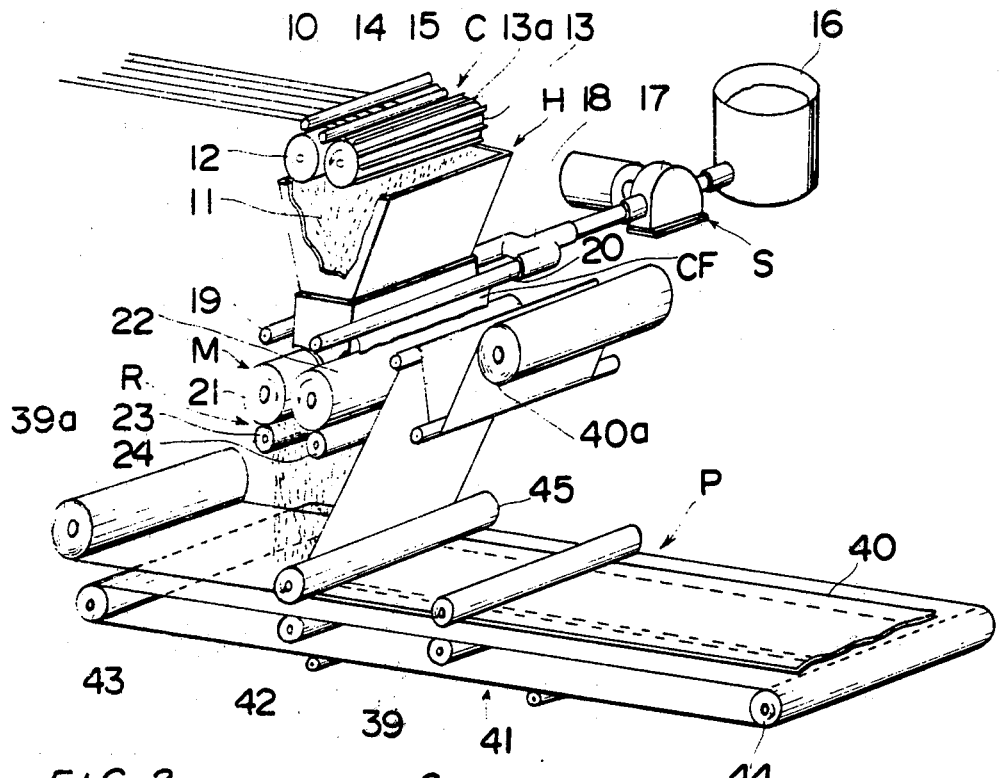

United States Patent [19]
Mizutani et al.

[11] 3,932,980
[45] Jan. 20, 1976

[54] APPARATUS FOR CONTINUOUSLY MAKING A MIXTURE OF VISCOUS MATERIAL WITH SOLID MATERIAL

[75] Inventors: Keiiti Mizutani; Akira Ogino, both of Osaka; Minoru Yamada, Hyogo; Nobuyuki Nakagawa, Osaka, all of Japan

[73] Assignee: Takeda Chemical Industries, Ltd., Osaka, Japan

[22] Filed: Dec. 30, 1974

[21] Appl. No.: 537,420

[30] Foreign Application Priority Data
Jan. 23, 1974  Japan................................ 49-10500
Jan. 23, 1974  Japan................................ 49-10499

[52] U.S. Cl.................. 53/111; 53/177; 53/180; 259/2; 259/185
[51] Int. Cl.²... B65B 9/02; B65B 9/04; B01F 15/02
[58] Field of Search.......... 259/2, 185; 53/111, 177, 53/180

[56] References Cited
UNITED STATES PATENTS

| | | | |
|---|---|---|---|
| 2,879,042 | 3/1959 | Jones | 259/2 |
| 3,280,764 | 10/1960 | Potter et al. | 259/185 X |
| 3,681,485 | 8/1972 | Lieberman | 259/185 X |

*Primary Examiner*—Frank T. Yost
*Assistant Examiner*—Leon Gilden
*Attorney, Agent, or Firm*—Wenderoth, Lind & Ponack

[57] ABSTRACT

An apparatus for continuously making a mixture of viscous material with solid material, which comprises a pair of spaced mixing rolls for dragging the viscous material and the solid material into a gap between the mixing rolls to permit the materials to be mixed together. A pair of removal rolls, each rotatable at a higher speed than any of the mixing rolls, are provided below the mixing rolls respectively spaced a predetermined distance from the associated mixing rolls for removing layers of the mixture sticking in part to one mixing roll and in part to the other mixing roll, off from the mixing rolls. The mixture removed from the mixing rolls by the removal rolls falls downwardly onto a packaging process wherein the mixture is packed between a pair of carrier sheets of synthetic resin material.

8 Claims, 9 Drawing Figures

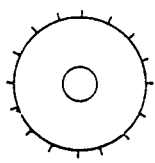 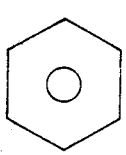 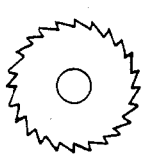 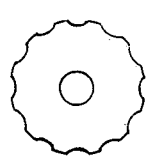
FIG. 3a   FIG. 3b   FIG. 3c   FIG. 3d
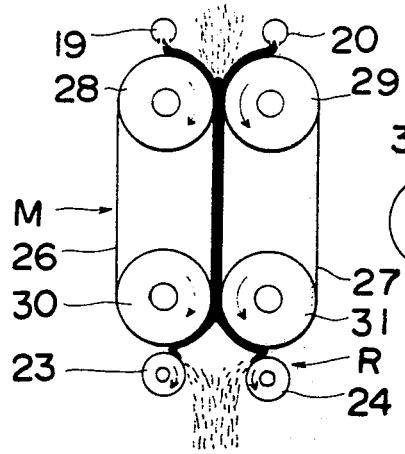
FIG. 4
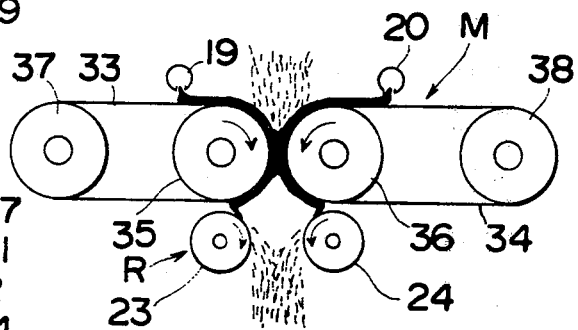
FIG. 5
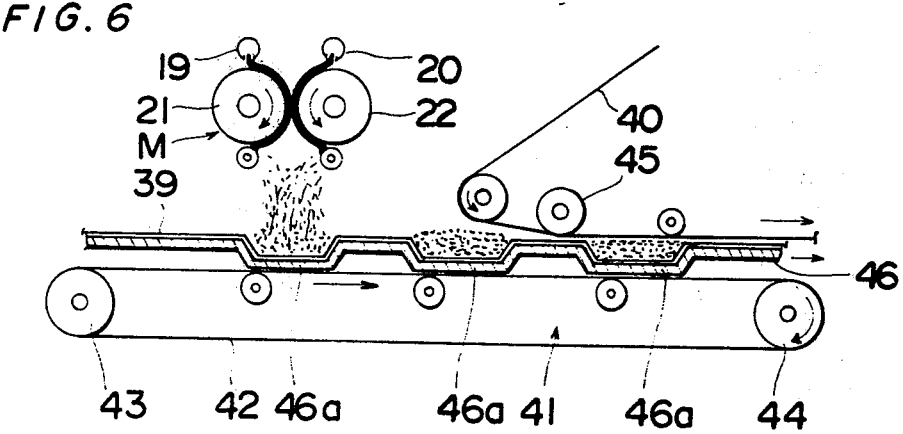
FIG. 6

APPARATUS FOR CONTINUOUSLY MAKING A MIXTURE OF VISCOUS MATERIAL WITH SOLID MATERIAL

The present invention relates to an apparatus for continuously making a mixture of viscous material with solid material.

More particularly, the present invention relates to an apparatus for continuously preparing a mixture of viscous material, such as synthetic resin or food material, of a nature whose chemical and/or physical properties are susceptible to the elevated temperature, with solid material, such as powdered material, particles, flakes, granules, chopped strands, rovings, fibrous material or other, of a nature which tends to be easily damaged by an external physical force applied thereto.

A blade- or screw-type mixer or a kneading device has heretofore been employed to mix viscous material of the type referred to above with solid material of the type referred to above. Although in certain cases the conventional mixer is satisfactorily employed for making a mixture of solid and viscous materials to some extend, the mixer must be of a type capable of generating a relatively high shearing force where the material of high viscosity is to be mixed with the solid material. A relatively great shearing force is required for the highly viscous material to be fluidized and, however, the greater the shearing force generated by the mixer, the more often the solid material to be mixed in said highly viscous material is physically damaged. Moreover, the employment of the high shearing force often accompanies a frictional heat evolved in the high viscous material during mixing operation with the solid material and, therefore, chemical and physical properties of the high viscous material change in a varying degree depending upon the type of the viscous material.

For facilitating a better understanding of the present invention, a prior art method of making a fiber reinforced plastic, which itself is prepared by mixing a highly viscous synthetic resin with glass fibers of a sort of solid material, will now be described by way of example.

As varieties of fiber reinforced plastic for use in plastic molding, a sheet molding compound (SMC), a bulk molding compound (BMC), a premix molding compound (PMC) and other molding compounds are known. Any of these varieties is prepared by mixing one or a combination of synthetic resins, such as unsaturated polyester resins or epoxy resins, with various additives including a filler, such as one or a mixture of calcium carbonate, clay, silica, plaster, barium sulfate and others, a hardening agent, a plasticizer, a coloring agent, such as one or a mixture of pigments, a catalyst, a stabilizer, a reinforcement such as one or a mixture of natural and/or synthetic fibers including glass fiber, and a viscosity increasing agent. During the preparation of the molding compound, the mixture of synthetic resin and additives represents a viscous state and is supplied as a molding material in the form of lumps or sheets or in any convenient shape easy to handle, after the mixture has substantially lost viscosity.

Particularly, BMC and PMC are usually supplied as a molding material in the form of lumps and can, therefore, be preformed easily into a rod-like or ribbon-like shape or any other convenient shape in readiness for molding operation. However, during a step in which the synthetic resin and the additives including the reinforcement are mixed, the mixture is inevitably subjected to the relatively high shearing force in the mixer and, therefore, the reinforcement is easily damaged physically. Moreover, the content of the reinforcement acceptable in the mixture is so limited that improvement in the physical strength of the resultant reinforced plastic molding material cannot be expected.

On the contrary thereto, the molding material known as SMC is of a so-called sandwitch structure wherein the mixture is sandwitched between carrier sheets of polyethylene. This SMC is substantially prepared by applying a paste of mixture of the synthetic resin with the additives except for the reinforcement on one of the carrier sheets which is substantially horizontally transferred in one direction, distributing the reinforcement, for example, in a chopped form onto the paste, covering the other carrier sheet, which has also been applied with the same paste as applied on said one of the carrier sheets, over the mixture on said one of said carrier sheets to render the mixture sandwitched between these carrier sheets, and passing the mixture, which has been sandwitched between the carrier sheets, through a pair of juxtaposed compression rolls to facilitate distribution of the reinforcement in the paste.

In the manufacture of the SMC, since the compression rolls merely act to press the mixture from both sides thereof through the carrier sheets, no reinforcement included therein can be impaired physically. However, there is a disadvantage in that, since the depth of submergence of glass fibers for the reinforcement into the paste is restricted partly because of its considerably small weight and partly because of the viscosity of the paste, a SMC having a thickness more than about 3 mm. cannot be practically manufactured. Most commercially available sheet molding compounds range in thickness from 2 to 3 mm. and employment of a relatively thin SMC for molding a shaped article often provides inconveniences. In other words, if a single SMC has a relatively small thickness, a plurality of SMC must be piled up in a compression molding machine in order to manufacture a compression-molded article having a relatively great wall thickness. This involves a complicated and time-consuming procedure to be carried out prior to supply of the SMC into the compression molding machine in such a way as to peel or remove the carrier sheets, one pair for each SMC, and then to place one SMC above the other. As a matter of practice, prior to the supply into the compression molding machine, each SMC may be broken into a desired or required size and, thereafter, the carrier sheets on the SMC are removed.

The present invention has been developed after a series of research and development the inventors have conducted to eliminate the above disadvantage and inconveniences inherent in the conventional SMC and concurrently to provide a convenient method of making a molding compound which can be efficiently manufactured at a substantially reduced cost without the reinforcement being physically impaired, which therefore has a physical strength comparable to that of the conventional SMC, which has a relatively great thickness and which can be supplied on the market in the form of a sheet, rod or any other desired or required shape. One feature of the present invention is, therefore, based on the finding that, as a paste or a viscous compound of synthetic resin is transported through a gap of a predetermined size between a pair of juxtaposed mixing rolls being rotated in the opposite directions with respect to each other while reinforcements, for example, chopped strands of glass fibers, are dispersed onto the viscous compound prior to said viscous compound being dragged into said gap, the viscous compound and the reinforcements are, together with the other additives, uniformly and sufficiently mixed.

Even though the uniform and sufficient mixing can be achieved as the viscous compound is transported through the gap between the mixing rolls, the viscous compound may, because of its relatively high viscosity, roll up sticking in part to one mixing roll and in part to the other mixing roll, as both of the mixing rolls continue rotating, far from the resultant mixture being delivered onto a subsequent process, that is, a sheet wrapping process. In order to remove such an occurrence, so-called doctor knives, which are known as a substantially strip-shaped blade used for removing or scraping off from a rigid base any material sticking to the rigid base, may be employed each for one mixing roll, in such an arrangement that these doctor knives are provided below and in contact with the respective peripheral surfaces of the individual mixing rolls. However, the employment of the doctor knives in the manner as hereinabove described has been found unfavourable.

First, unless each of the doctor knives has a sufficiently high physical strength, one or both of the doctor knives tend to be deformed transversely of the lengthwise direction of the knife edge, thereby departing from the sliding engagement to the peripheral surface of the corresponding mixing roll. This often occurs as reinforcements admixed in the viscous compound are entangled around the knife edge of each of the doctor knives.

Secondly, even if such an occurrence as described above will not take place, reinforcements are physically impaired in contact with the knife edges of the respective doctor knives and, in addition thereto, heat of considerably elevated temperature is generated by the friction between the knife edges of the doctor knives and the peripheral surfaces of the mixing rolls. Where the viscous compound comprises a thermosetting plastic, generation of the heat means partial heating of the viscous compound and, therefore, once the heated portion of the viscous compound is cooled in contact with, for example, ambient air, that portion of the viscous compound becomes permanently hardened resulting in a machine trouble or malfunction.

Another important feature of the present invention is, therefore, based on the finding that, by employing removal rolls in such a manner that they are arranged for rotation at a relatively high speed below and in spaced relation to the respective mixing rolls, each of said removal rolls being rotated in a direction opposite to the rotational direction of the corresponding mixing roll situated immediately thereabove, a layer of the viscous compound, which has been already mixed with the reinforcements and has emerged from the gap between the mixing rolls sticking to both of the mixing rolls, can effectively be removed from the individual mixing rolls substantially without bein rolled up around the respective mixing rolls. The viscous compound thus removed from the mixing rolls is centrifugally splashed onto the subsequently performed sheet wrapping process.

It is to be noted that the present invention also pertains to a method of making the plastic molding compound. In practising this method according to the present invention, any known substances may be employed for manufacturing the plastic molding compound. By way of example, the synthetic resin may be chosen from polyester resins or epoxy resins and is previously admixed with viscosity increasing agent and catalyst. If desired or required, one or more of fillers, plasticizers, coloring agents, stablizers and other additives may be added to the resin composition. The reinforcement may be a glass fiber or any other natural or synthetic fiber.

Figure 2:
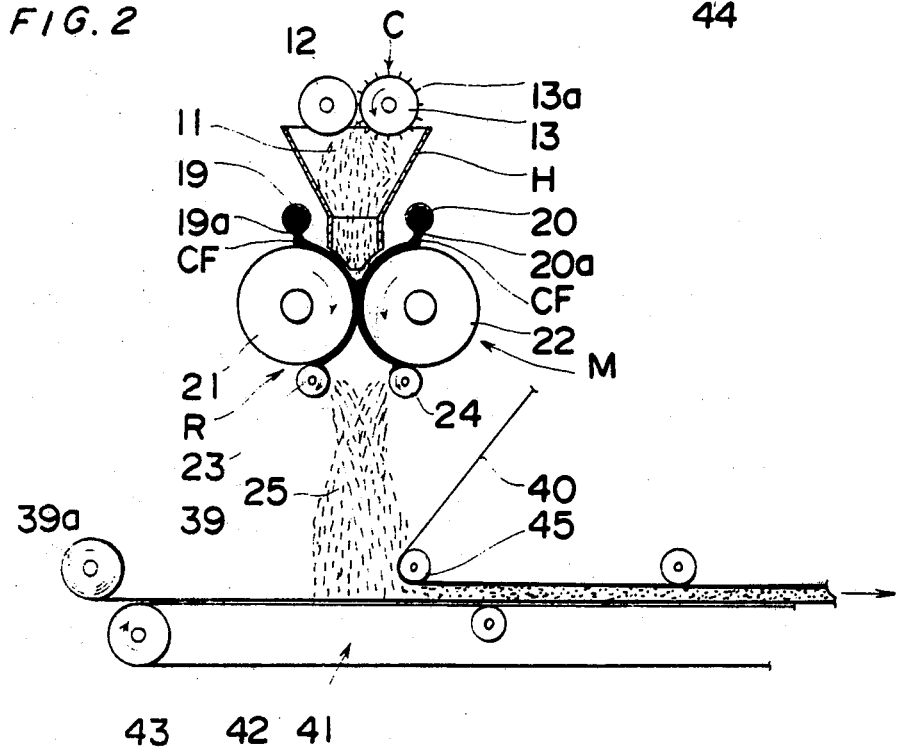

These and other objects and features of the present invention will become apparent from the following description taken in conjunction with preferred embodiments thereof with reference to the accompanying drawings, in which:

FIG. 1 is a schematic perspective view of an apparatus for making a plastic molding compound in the form of SMC, constructed according to the teachings of the present invention, FIG. 2 is a schematic side view of an essential portion of the apparatus shown in FIG. 1, FIGS. 3(a) to (d) illustrate various sections of any of removal rolls forming a removing unit of the apparatus shown in FIG. 1, FIGS. 4 and 5 illustrate different types of the mixing unit, which may be employed in the apparatus of FIG. 1, and FIG. 6 is a schematic side view of an essential portion of the apparatus of FIG. 1, showing the plastic molding compound manufactured in the form of a rod or a lamp.

Before the description of the present invention proceeds, it should be noted that like parts are designated by like reference numerals throughout the accompanying drawings. It is also to be noted that the terms "synthetic resin composition" hereinbefore and hereinafter employed should be understood as meaning a synthetic resin admixed with the above described additives in a known manner except for the reinforcements.

Referring first to FIG. 1 and FIG. 2, the apparatus so far illustrated includes a chopping unit C for breaking a plurality of rovings 10 of glass fibers for reinforcement into chopped strands 11 of, for example, 2 to 3 cm. in length. The chopping unit comprises a rubber lined roll 12 and a chopping roll 13, both being horizontally supported by a machine framework (not shown) in spaced relation to each other and for rotation in the opposite directions with respect to each other. The chopping roll 13 rotatable in the counterclockwise direction so far shown has a peripheral surface mounted with a plurality of blades 13a equally spaced from each other around said peripheral surface, each of which blades 13a extending over the whole length of said chopping roll 13. The blades 13a acts to chop the fiber rovings 10 into the chopped strands 11 in cooperation with the rubber lined roll 12 as said rolls 12 and 13 rotate. Positioned above the rubber lined roll 12 in parallel relation to the roll 12 are a pair of spaced retaining rolls 14 and 15 for retaining the fiber rovings 10 against the peripheral surface of the rubber lined roll 12. One or both of the rolls 12 and 13 may be coupled to a drive mechanism (not shown) including a common drive motor and power transmission systems.

The chopped strands 11 fall by gravity onto a mixing unit M through through a hopper or enclosure H. The hopper H acts, as can be envisaged particularly from FIG. 2, to guide a continuously falling mass of chopped strands 11 onto the mixing unit M without being blown off the course down the way towards the mixing unit M.

A supply unit S for supplying a synthetic resin composition onto above the mixing unit M in a manner as will be described in detail includes a batch tank 16 for accommodating therein a mass of the synthetic resin composition, which batch tank 16 is fluid coupled through a motor-driven pump 17 to a divider 18. The divider 18 is is a branched pipe having three openings; one opening being fluid-coupled to the pump 17 and the other two openings being coupled with respective supply ducts 19 and 20 which extend in parallel relation to each other on both sides of the hopper H. These supply ducts 19 and 20 may be of the same construction and each duct has a free end closed, a substantially intermediate portion of which duct is, as shown in FIG. 2, formed with a downwardly opening slot 19a or 20a. Although a structural relation between these ducts 19 and 20 and the mixing unit M will be described later, it is to be noted that the motor-driven pump 17 is preferably of a type capable of supplying the synthetic resin composition from the batch tank 16 onto the mixing unit M through the ducts 19 and 20 under a predetermined fluid pressure and at a constant rate.

The mixing unit M comprises a pair of mixing rolls 21 and 22 supported by the machine framework immediately below the bottom opening of the hopper H for rotation in the opposite directions, as indicated by the arrows, with respect to each other. These rolls 21 and 22 extend in parallel relation to the supply ducts 19 and 20, which are respectively positioned above said mixing rolls 21 and 22, and are so spaced from each other that the minimum distance between the peripheral surfaces of said mixing rolls 21 and 22 is within the range of 0.3 to 5.0 mm. and, preferably, 2 mm. Both of these mixing rolls 21 and 22 are operatively coupled to each other so as to rotate in the opposite directions, through a train of gears (not shown) which is in turn coupled to the common drive mechanism (not shown).

The ducts 19 and 20 situated above the respective mixing rolls 21 and 22 may be either supported to the machine framework (not shown) or secured to the hopper H at a lower portion thereof adjacent the associated mixing rolls 21 and 22. The slots 19a and 20a in the respective ducts 19 and 20 are so sized that a cascade flow of the synthetic resin composition emerging from each of said slots 19a and 20a, as indicated by CF, has a width sufficient to left margines on both end portions of the corresponding mixing roll 21 or 22 when the cascade flow CF of the synthetic resin composition subsequently forms a layer on the peripheral surface of the corresponding mixing roll 21 or 22.

In the construction so far described, assuming that the pump 17 is operated to supply the synthetic resin composition from the batch tank 16 to the supply ducts 19 and 20 while the chopping unit C is operated to break the fiber rovings 10 into the chopped strands 11 downwardly falling through the hopper H, the cascade flows CF of the composition downwardly emerging from the respective slots 19a and 20a in the supply ducts 19 and 20 form layers on the mixing rolls 21 and 22, which layers of the synthetic resin composition adjoin within the gap between the mixing rolls 21 and 22 as said rolls 21 and 22 rotate in the opposite directions. Simultaneously therewith, the chopped strands 11 of glass fibers for reinforcement are dispersed or scattered on the outer surface of each of the layers of the synthetic resin composition around the mixing rolls 21 and 22.

As best shown in FIG. 2, as the layers of the synthetic resin composition on the mixing rolls 21 and 22, which are situated above the level of the narrowest portion of the gap between the mixing rolls 21 and 22, adjoin to each other and subsequently pass through the gap between the mixing rolls 21 and 22 during rotation of said rolls 21 and 22, the chopped strands of glass fibers are first enfolded in between the layers of the synthetic resin composition and subsequently forced to admix deep into the resin composition then passing through the gap between the mixing rolls 21 and 22. It is, therefore, clear that none of the chopped strands of glass fibers receive a physical force which may otherwise be applied by the mixing rolls 21 and 22 as the synthetic resin composition, admixed with said chopped strand, passes through the narrowest portion of the gap between said mixing rolls 21 and 22.

As previously stated, the minimum distance between the peripheral surfaces of the respective mixing rolls 21 and 22, that is, the size of the gap between the mixing rolls 21 and 22, is within the range of 0.3 to 5.0 mm. However, a particular value for the gap size should be chosen within said range in consideration of the outer diameter of each of the mixing rolls 21 and 22 and the viscosity of the synthetic resin composition, so that the layers of the synthetic resin composition on the peripheral surfaces of said mixing rolls 21 and 22 above the level of said narrowest portion of said gap can adjoin to each other prior to being passed through the narrowest portion of said gap between said rolls 21 and 22.

More particularly, each of the mixing rolls 21 and 22 has an outer diameter preferably within the range of 100 to 1,000 mm. and is rotated at a rate preferably within the range of 1 to 200 r.p.m. By suitably selecting the size and rotational rate of the mixing rolls 21 and 22, a satisfactory and uniform mixing of the synthetic resin composition with the reinforcements can be achieved as said syntheric resin composition pass through the gap between the mixing rolls 21 and 22.

The resultant mixture emerging from the gap between the mixing rolls 21 and 22 is, as the mixing rolls 21 and 22 continue to rotate, transferred to a removing unit R, of a construction as will now be described, sticking in part to the mixing roll 21 and in part to the mixing roll 22. The removing unit R comprises a pair of removal rolls 23 and 24 which are supported by the machine framework and respectively extend immediately below and in parallel relation to the mixing rolls 21 and 22. In a similar manner as the mixing rolls 21 and 22, these removal rolls 23 and 24 are operatively coupled to each other so as to rotate in the opposite directions, as indicated by the arrows, through a train of gears (not shown) which is in turn coupled to the common drive mechanism (not shown). However, it should be noted that the outer diameter of each of the removal rolls 23 and 24 is smaller than that of the mixing rolls 21 and 22 and, preferably, within the range of 50 to 200 mm. and that the rotational rate of said removal rolls 23 and 24 is higher than that of the mixing rolls 21 and 22 and, preferably, within the range of 1,000 to 10,000 r.p.m. It is also to be noted that, although the removal rolls 23 and 24 rotate in the opposite directions with respect to eath other, these are rotated in the same direction as the mixing rolls 21 and 22 respectively situated immediately above said removal rolls 23 and 24.

Each of the removal rolls 23 and 24 is spaced from the corresponding mixing roll 21 or 22 situated immediately thereabove in such a manner that the minimum distance between the peripheral surfaces of the mixing roll 21 or 22 and removal roll 23 or 24 is within the range of 0.05 to 2.00 mm. and, preferably, within the range of 1/5 to ½ of the size of the gap between the mixing rolls 21 and 22. However, 0.5 mm. is more preferred for this distance.

As clearly shown in FIG. 2, the resultant mixture emerging from the gap between the mixing rolls 21 and 22 is, as hereinbefore described, splid into two cascading layers respectively sticking to the mixing rolls 21 and 22 during rotation of said rolls 21 and 22. Since both of the removal rolls 23 and 24 function in the same manner relative to the respective cascading layers of the mixture of synthetic resin composition and chopped strands of glass fibers, reference will now be made only to the function of the removal roll 23 in relation to the cascading layer sticking to the mixing roll 21 for the sake of brevity.

The front of the cascading layer of the mixture that has emerged through the gap between the mixing rolls 21 and 22 approaches the removal roll 23 positioned below the mixing roll 21 during rotation of the latter. Since the removal roll 23 is rotated at a higher speed than the mixing roll 21, the cascading layer of the mixture is, upon contact of the front thereof with the peripheral surface of the removal roll 23, expelled off from the peripheral surface of the mixing roll 21 by a centrifugal force generated by the rotation of the removal roll 23. No substantial portion of the cascading layer of the mixture is rolled up around the mixing roll 21 past the removal roll 23. The mixture thus expelled off from the peripheral surface of the roll 21 downwardly fall by gravity in the form of spattered particles as indicated by 25.

In the embodiment shown in FIGS. 1 and 2, each of the removal rolls 23 and 24 is shown in the form of an elongated cylinder of circular section. However, it may have a cross sectional shape as shown in any of FIGS. 3 (a) to (d). In other words, the removal roll shown in FIG. 3(a) is an elongated cylinder of circular cross section having the peripheral surface provided with a plurality of equally spaced blades each extending over the length of said removal roll. The removal roll shown in FIG. 3(b) is an elongated cylinder of polygonal cross section. The removal roll shown in FIG. 3(c) has a cross sectional shape similar to a geared wheel while the removal roll shown in FIG. 3(d) is an elongated cylinder of substantially circular cross section having the peripheral surface formed with a plurality of equally spaced grooves which extend in parallel to each other over the length of the removal roll.

In addition, the mixing unit M, which has been described as comprising the mixing rolls 21 and 22 in the embodiment of FIGS. 1 and 2, may comprise a pair of spaced endless belts 26 and 27 respectively suspended around a pair of vertically spaced rolls 28 and 30 and a pair of vertically spaced rolls 29 and 31, such as shown in FIG. 4 or a pair of spaced endless belts 33 and 34 respectively suspended around a pair of horizontally spaced rolls 35 and 37 and a pair of horizontally spaced rolls 36 and 38 such as shown in FIG. 5.

More specifically, in the embodiment of FIG. 4, a lower couple of rolls 30 and 31 are motor-driven and are positioned on the same level with respect to each other. On the other hand, an upper couple of rolls 28 and 29 may serve idle rolls and are positioned on the same level with respect to each other. Respective downward runs of these belts 26 and 27 define a gap through which the mixture is transported onto the removal unit R. The embodiment of FIG. 5 may be considered that the rolls 28 and 29 in the embodiment of FIG. 4 are respectively positioned to the left of the roll 30 and to the right of the roll 31 as viewed from FIG. 4.

Referring back to FIGS. 1 and 2, the downwardly falling particles of mixture of the synthetic resin composition and the reinforcements are packed by a pair of carrier sheets 39 and 40 of synthetic material, for example, polyethylene, in a manner as will now be described.

The carrier sheet 39 is fed from a roll of polyethylene sheet 39a resting on an endless belt conveyor which is generally indicated by 41. The endless belt conveyor 41 comprises an endless belt 42 operatively suspended between a pair of spaced rolls 43 and 44 (the roll 44 being shown in FIG. 6), one of said rolls 44 being coupled to the common drive mechanism or a separate drive motor (not shown) to drive the endless belt 42 in one direction. The endless belt 42 extends immediately below the removal unit R and in a direction transverse of the rotational axis of any of the mixing and removal rolls 21 to 24.

A web of carrier sheet 39 drawn from the roll 39a moves in contact with an upper run of the endless belt 42 in the direction indicated by the arrow-headed line while it receives, as it passes immediately below the removal unit R, the downwardly falling particles 25 of the mixture.

Positioned above the upper run of the endless belt 42 at the leading side relative to the removal unit R and crossing said upper run of said endless belt 42 is a levelling roll 45. Around the levelling roll 45, a web of carrier sheet 40 drawn from a roll of sheet 40a which is positioned far above the conveyor 41 is turned and extends in parallel relation to the upper run of the endless belt 42. Although not shown, respective free ends of these carrier sheets 39 and 40 opposite to the associated rolls 39a and 40a are connected to a take-up roll or spool forming a part of a sheet winding mechanism.

Therefore, it is clear that as the webs of carrier sheets 39 and 40 are taken up by the sheet winding mechanism (not shown) operating in synchronism with the conveyor 41, the particles 25 of the mixture, which continuously fall onto the carrier sheet 39 and forms a deposit thereof, is first levelled by the levelling roll 45 while they enter a clearance between the horizontally moving portion of the carrier sheet 40 and the upper run of the endless belt 42, and then sandwitched between the carrier sheets 39 and 40. Thereafter, the mixture sandwitched between the carrier sheets 39 and 40 is, in the form of a SMC, wound around the take-up roll or spool. It should be noted that, because of the construction of the apparatus as hereinbefore fully described, the clearance between the levelling roll 45 and the upper run of the endless belt 42 may be greater than that heretofore employed in the conventional SMC manufacturing machine so that a SMC of a relatively great thickness can be provided by the machine according to the present invention.

The speed of movement of the endless belt 42 is preferably determined in consideration of the amount of the mixture particles 25 falling from the removal unit R per unit time so that the reinforced plastic molding compound of uniform thickness over the length thereof can be obtained.

Referring now to FIG. 6, in the case where the reinforced plastic molding compound is desired to be obtained in the form of a rod of any cross sectional shape, for example, a substantially trapezoidal cross sectional shape, a back-up mold 46 having a plurality of equally spaced receptacles 46a may be inserted between the carrier sheet 39 and the upper run of the endless belt 42. Although the receptacles 46a shown in FIG. 6 is shown as integrally connected to each other, they may be a separate receptacle.

The present invention will now be illustrated by way of example.

Three types of fiber reinforced plastic molding compounds, each being of a composition as described in Table I, were manufactured by the use of the apparatus of the arrangement shown in FIG. 1 wherein the outer diameter of each of the mixing rolls 21 and 22 was 300 mm., the gap size between the mixing rolls 21 and 22 was 2 mm., the rotational rate of these mixing rolls 21 and 22 was 50 r.p.m. the outer diameter of each of the removal rolls 23 and 24 was 100 mm., the minimum distance between the mixing rolls 23 and 24 and the associated removal rolls 23 and 24 was 1 mm., and the rotational rate of the removal rolls 23 and 24 was 2,000 r.p.m.

Physical characteristics of each of these types of fiber reinforced plastic molding compounds, identified by Types I, II and III, respectively, were tested and compared with the conventional BMC and SMC, as shown in Table II.

Although the present invention has been described as applied to the manufacture of fiber reinforced plastic molding compounds, it will readily be clear that it can be equally applicable to the manufacture of some kinds of food to be prepared by mixing a high viscous material with solid material. Moreover, various changes and modifications are apparent to those skilled in the art without departing from the true scope of the present invention and, therefore, they should be construed as included within the true scope of the present invention unless they depart therefrom.

What is claimed is:

1. An apparatus for continuously making a mixture of viscous material with solid material, which comprises;

first and second rotatable members supported in position for rotation in the opposite directions with respect to each other and spaced a predetermined distance from each other to define a mixing gap therebetween;

first supply means for supplying the viscous material and for generating zones of cascading flow of said viscous material, said zones of cascading flow of said viscous material being respectively downwardly oriented towards said first and second rotatable members, said cascading flow of said viscous material in said zones forming a viscous layer around said first and second rotatable members, said viscous layers on said first and second rotatable members adjoining to each other and subsequently entering said mixing gap as said first and second rotatable members are rotated in the opposite directions to each other;

second supply means for supplying the solid material onto said viscous layers, said solid material after having been supplied onto said viscous layers being dragged into said mixing gap during rotation of said first and second rotatable members to mix with said viscous material as it pass through said mixing gap; and third and fourth rotatable members supported in position below said first and second rotatable members for rotation in the opposite directions to each other at a higher speed than any of said first and second rotatable members, said third and fourth rotatable members being respectively rotated in the same direction as said first and second rotatable members and spaced a predetermined distance from said respective first and second rotatable members, said third and fourth rotatable members acting to remove the viscous mixture, which has emerged from said mixing gap sticking in part to said first rotatable member and in part to said second rotatable member, off from said first and second rotatable members, said mixture which has been removed from said first and second rotat- Table I

| Plastic Molding Compounds | COMPOSITION | | | | | | |
|---|---|---|---|---|---|---|---|
| | Unsaturated Polyester (%) | Calcium Carbonate (%) | Zinc Stearate (%) | Tert-butyl Perbenzoate (%) | Magnesium Oxide (%) | Glass Fiber (%) | Shape % Size |
| Con. BMC | 31.4 | 47.1 | 0.95 | 0.31 | 0.16 | 20.0 | Lump |
| Con. SMC | 34.1 | 34.1 | 1.00 | 0.35 | 0.35 | 30.0 | Sheet 2.5mm. in Thickness |
| Type I | 34.1 | 34.1 | 1.00 | 0.35 | 0.35 | 30.0 | Lump |
| Type II | do. | do. | do. | do. | do. | do. | Rod |
| Type III | do. | do. | do. | do. | do. | do. | Sheet 10 mm. in Thickness |

Table II

| Plastic Molding Compounds | Bending Strength (Kg/mm²) | Bending Elasticity (Kg/mm²) | Tensile Strength (Kg/mm²) | Tensile Elasticity (Kg/mm²) | Izod Impact Value (Kg.cm/cm²) |
|---|---|---|---|---|---|
| Con. BMC | 10.6 | 1,060 | 4.5 | 990 | 28.2 |
| Con. SMC | 17.3 | 1,150 | 8.5 | 1,050 | 43.2 |
| Type I | 16.1 | 1,050 | 7.6 | 1,160 | 40.1 |
| Type II | 15.8 | 1,010 | 8.3 | 1,100 | 46.5 |
| Type III | 18.5 | 1,100 | 9.2 | 1,120 | 45.3 | able members subsequently falling downwards by gravity and being then collected.

2. An apparatus as claimed in claim 1, wherein said first and second rotatable members comprise cylindrical rolls, respectively.

3. An apparatus as claimed in claim 1, wherein said first and second rotatable members comprise endless belts which are substantially vertically extending in parallel relation to each other, the adjacent runs of said belts defining said mixing gap.

4. An apparatus as claimed in claim 1, wherein said first and second rotatable members comprise endless belts which are substantially horizontally extending in line with each other, the adjacent ends of said belts defining said mixing gap.

5. An apparatus as claimed in claim 1, further comprising a packaging unit for packing the mixture, which has been removed off from said first and second rotatable member and subsequently fallen downwards, between a pair of carrier sheets of synthetic resin.

6. An apparatus as claimed in claim 5, wherein said first and second rotatable members comprise cylindrical rolls, respectively.

7. An apparatus as claimed in claim 5, wherein said first and second rotatable members comprise endless belts which are substantially vertically extending in parallel relation to each other, the adjacent runs of said belts defining said mixing gap.

8. An apparatus as claimed in claim 5, wherein said first and second rotatable members comprise endless belts which are substantially horizontally extending in line with each other, the adjacent ends of said belts defining said mixing gap.

* * * * *